United States Patent Office 3,189,632
Patented June 15, 1965

3,189,632
ALKYLSULPHONYLOXY ESTERS
Tibor Horváth, Endre Csányi, László Vargha, and Boris Dumbovich, Budapest, Hungary, assignors to Chinoin Gyógyszer-és Vegyeszeti Termekek Gyára R.T., Budapest, Hungary
No Drawing. Filed Apr. 4, 1962, Ser. No. 184,918
11 Claims. (Cl. 260—456)

This invention relates to certain new alkylsulphonyloxy-derivatives and methods for preparing the same. More particularly it relates to alkylsulphonyl-ethylamino-derivatives of alkanes and oxyalkanes and to chemical methods for the preparation of said compounds.

It has been found according to the present invention that alkanes and oxyalkanes, consisting of 3-6 membered carbon-chains and bearing the substituent group of the formula

$$R\text{—}SO_2\text{—}O\text{—}CH_2\text{—}CH_2\text{—}NH\text{—} \qquad I$$

(where R stands for an alkyl radical containing 1-3 carbon atoms) on one or two carbon atoms of the alkane chain and their salts, are valuable compounds, which show cytostatic effects and thus may be used for medical and veterinary purposes. This type of chemicals is entirely new and was never described before in chemical literature.

The 3-6 membered alkane compounds are preferably hexane, isohexane, propane, butane, pentane or their derivatives. As oxyalkanes, sugars or sugaralcohols may be used with preference, e.g., hexitols, erythritol, D- and L-mannitol, D-sorbitol, L-iditol, D-glucose, L-sorbose and their derivatives.

The substituent group of the Formula I is preferably attached to the alkane or oxyalkane chain through one or two carbon atoms which occupy end-positions of the alkane chain. Thus, e.g., 1,6-bis-β-ethanesulfonyl-oxyethylamino-1,6-didesoxy-D-mannitol, 1,6-bis-β-methanesulfonyl-oxyethylamino-1,6-didesoxy-D-mannitol, 1,6-bis-β-methanesulfonyl-oxyethylamino - n - hexane; 1,5-bis-β-methanesulfonyl - oxyethylamino - n - pentane; 1,3-bis-β-methanesulphonyl - oxyethylamino - propane; 1,4 - bis-β-methanesulphonyloxyethylamino - n - butane; 1,4 - bis - β-methanesulphonyl - oxyethylamino - 1,4-didesoxy - meso-erythritol; 1,6 - bis-β - methanesulphonyl - oxyethylamino-1,6-didesoxy-D - sorbitol; 1,6-bis - β - methanesulphonyl-oxyethylamino - 1,6 - didesoxy - L - mannitol; 1,4 - bis - β-ethanesulphonyl - oxyethylamino - 1,4 - didesoxy - meso-erythritol are valuable representatives of this group of pharmaceuticals.

The compounds may be used in the form of their salts. Salts formed with various acids may be prepared. Thus salts formed with mineral acids, as halogenides, sulphates, phosphates, may be prepared. Salts formed with organic acids may be prepared too, such as salts with acetic, formic, propionic acids, or dicarboxylic acids, as oxalic acid, or salts with tartaric acid, citric acid, ascorbic acid and the like. Salts formed with alkylsulphonic acids are found to be advantageous and may be easily prepared. Similarly salts formed with boric acid may be prepared.

It has been found further according to the present invention that the new compounds detailed above may be prepared by introducing at once or stepwise the group

$$R\text{—}SO_2\text{—}O\text{—}CH_2\text{—}CH_2\text{—}NH\text{—} \qquad I$$

in one or two carbon atoms of alkanes or oxyalkanes containing 3-6 carbon atoms in the alkane chain, or by hydrolyzing alkanes or oxyalkanes containing 3-6 carbon atoms in the alkane chain, which are substituted at one or two carbon atoms by the group

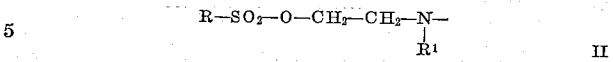

$$\begin{array}{c}R\text{—}SO_2\text{—}O\text{—}CH_2\text{—}CH_2\text{—}N\text{—}\\ \phantom{R\text{—}SO_2\text{—}O\text{—}CH_2\text{—}CH_2\text{—}}|\\ \phantom{R\text{—}SO_2\text{—}O\text{—}CH_2\text{—}CH_2\text{—}}R^1\end{array} \qquad II$$

(where $R^1$ stands for a protecting group which is readily hydrolized by acidic treatment), by treatment with an acid.

When introducing the group of Formula I into oxyalkane compounds one may proceed by using as starting material sugar or sugaralcohol-derivatives the hydroxyl groups of which have been partly or entirely protected by acetal- or acyloxy-groupings. These protecting groupings are eliminated by known methods from the molecule after introduction of the grouping or groupings of Formula I.

When carrying out the process according to the invention, one may proceed by reacting alkanes or oxyalkanes containing 3-6 carbon atoms in their alkane chain, and substituted on one or two of their carbon atoms with a group or groups of the formula

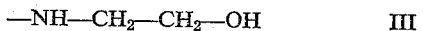

$$\text{—}NH\text{—}CH_2\text{—}CH_2\text{—}OH \qquad III$$

or salts of such compounds, with an alkyl-sulphonating agent. Alkylsulphonating agents which may be used for this purpose with preference are alkylsulphonic acid anhydrides, alkylsulphonic acid halogenides. Thus e.g. methanesulphonic acid anhydride, ethanesulphonic acid anhydride, methanex- and ethanesulphonic acid halogenides may be used.

A further method is to bring about the process of the invention consists in reacting 3-6 membered alkanes or oxyalkanes substituted on one or two carbon atoms of the alkane chain with a beta-halogeno-ethylamino-grouping or groupings and a metal salt of an alkylsulphonic acid. Salts formed with heavy metals are preferably used for this purpose, such as the silver or lead salts of the corresponding acids.

Another method to carry into effect the process of the invention comprises to use as one of the starting materials 3-6 membered alkanes or oxyalkanes substituted on one or two of their carbon atoms with ethyleneimino-groups and reacting these compounds with an alkyl-sulphonic acid.

When using alkanes or oxyalkanes substituted with the grouping of Formula II as starting material, it is preferable to use compounds, where $R^1$ stands for a trityl-, isobutoxy- carbonyl-, or carbobenzoxy group.

The new compounds according to the invention may be converted into their acid acid salts by known methods.

The compounds of the invention may be used as cytostatic agents, for example by intravenous administration. The substance is kept for this purpose preferably in powder ampoules containing 2–5 cg. of the material, preferably in form of its salt, and the ampoules are filled directly before use with enough distilled and sterilized water, which may contain buffer salts in order to ensure the biological pH value, so that the salt is dissolved within short time giving a clear solution ready for use as an injection.

Pharmacological experiments carried out on rats and mice proved that e.g. 1,6-bis-β-methanesulphonyl-oxyethylamino - 1,6 - didesoxy - D - mannitol.2 HX (where HX=methanesulphonic acid, oxalic acid, hydrogen halogenide) show an inhibitive action on tumours and cause damage to the lymphoid elements of the blood to a high degree and with a pronounced electivity.

$DL_{50}=80–100$ mg./kg., administered intravenously, on mice.

Inhibitive action on tumours (6–8 treatments):

| Tumour | Doses, mg./kg. | | |
|---|---|---|---|
| | 0.5 | 2 | 4 |
| Yoshida's sc. carc. _____ rats__ | 55% | 87% | 90% |
| Guérin's carc. _____ rats__ | | | 79% |
| S 180 _____ mice__ | | | 66% |
| Ehrlich's ascites _____ mice__ | | | 81% (on the 14th day). |
| Németh's ascites lymphoma _____ mice__ | | | 100% (on the 11th day). |

According to our experiments the compounds inhibit nucleic division and are capable to produce serious degeneration of inactive tumour cells or their necrosis. The compound influences the number of lymphocytes of normal rats when administered in doses of 3 x 0.5 mg./kg. already, while doses of 3 x 5 mg./kg. cause an 82% decrease of the number of lymphocytes for two weeks. The decrease of the myeloid elements is neglectable and rises after a few days over the starting value.

1,6 - bis - β - methanesulphonyl - oxyethylamino - n-hexane-dichlorohydrate shows a similar, yet somewhat milder action on the above tumour types and on the blood picture of normal rats.

$LD_{50}=700$ mg./kg., administered intravenously, on mice.

More details of the process and particulars about the compounds are to be found in the examples.

Example 1

139 g. of silver methanesulphonate are dissolved in 960 ml. of anhydrous acetonitrile, whereupon 62.5 g. of pulverized 1,6 - bis-β-bromoethylamino-1,6-didesoxy-D-mannitol dibromohydrate (Nature, vol. 183, 1959, page 394) are added to the reaction mixture. The reaction mixture is then boiled for 10–13 hours while stirring intensely. When cooled, a precipitate appears, which consists of a mixture of the product with silver bromide. The precipitate is filtered and washed with plenty of acetonitrile. The filter cake is then triturated with 200 ml. of methanol, filtered hot and washed with 100 ml. of hot methanol. Silver is eliminated by introduction of hydrogen sulfide into the filtrate, whereupon methanol is evaporated under mild conditions. The residual partly crystalline gummy stuff is dissolved in some water and precipitated with warm ethanol, whereupon crystallization sets in on scrubbing. The needle-crystals thus formed are filtered, washed with ethanol and dried in a desiccator in the presence of sulphuric acid. 56.5 g. of 1,6-bis-β-methanesulphonyl-oxyethylamino - 1,6 - didesoxy - D - mannitol - dimethanesulphonate are obtained. The product contains two moles water of crystallization.

On evaporating the acetonitrile mother liquor, the excess silvermethanesulphonate may be regenerated. The crystalline residue is filtered, washed with some methanol, whereupon the regenerated silvermethanesulphonate is obtained. The filtrate is treated with gaseous hydrogen sulfide, filtered and the solvent is removed under reduced pressure. The residue is recrystallized from aqueous ethanol. A further quantity of the product, amounting to 7–8 g., is obtained.

The two product fractions are united and repeatedly recrystallized from aqueous ethanol. 56.9 g. of the product are thus obtained.

The methanesulphonic acid salt is capable to retain water of crystallization. On repeated recrystallization from anhydrous solvents, e.g. in acetonitrile or in a mixture of acetonitrile and methanol the product may be obtained in anhydrous state. This compound is dried at 50–60° C. in vacuo in presence of sulphuric acid and melts at 114–115° C.; $(\alpha)_D^{20}=+8.13°$ (c.=1 in methanol).

This compound is irresistant to air; it takes, on standing for a short time, 1 mole water of crystallization and after standing for a somewhat longer time 2 moles water of crystallization, while the melting point decreases.

The concentrated solution of the methanesulphonic acid salt in water or methanol is admixed to an excess of an aqueous solution of oxalic acid, whereupon the dioxalate of 1,6 - bis - β - methanesulphonyl - oxyethylamino - 1,6-didesoxy-D-mannitol is obtained in the form of white crystals. M.P.: 177° C. (decomposition);

$$(\alpha)_D^{20}=+8.98°$$

(c.=1 in water). This product may be recrystallized from water or aqueous methanol. Elementary analysis corresponds to the theoretical values.

The oxalate salt is dissolved in water to form a saturated solution and a saturated solution of aqueous calcium chloride is then added. Calcium oxalate precipitates from the mixture and is filtered. The filtrate is evaporated to dryness in a water bath of 40° C. in vacuo. On addition of warm ethanol the reaction mixture is cooled, whereupon the product precipitates in the form of white needle crystals, which are filtered and washed thoroughly with ethanol. The product is 1,6-bis-β-methanesulphonyl-oxyethylamino - 1,6 - didesoxy - D - mannitol dichlorohydrate. M.P.: 142–143° C.; $(\alpha)_D^{20}=+12.37°$ (c.=1 in water). This product may be recrystallized from aqueous ethanol. The elementary analysis is in agreement with the calculated values.

Example 2

29.5 g. of silver methanesulphonate are dissolved in 190 ml. of anhydrous acetonitrile and 12.5 g. of pulverized 1,6-bis-β-bromoethylamino-1,6-didesoxy-D-mannitol-dibromohydrate are added while stirring the reaction mixture. After boiling for 14 hours softly and stirring the mixture thoroughly the silver bromide formed is filtered (its weight corresponds to the calculated quantity). The filtrate is evaporated in vacuo, the residue is dissolved in methanol and silver is eliminated by introduction of hydrogen sulfide. After filtration of the silver sulfide the solution is evaporated under mild conditions in vacuo, whereupon a solution of 20 g. oxalic acid in 110 ml. of water is added. On cooling crystals are precipitated, the weight of which amounts on filtrating and drying to 11.8 g. Dissolved in water of 70° C. the undissolved remainder is filtered off and the filtrate is cooled rapidly. On filtrating the crystals 10.6 g. of 1,6 - bis - β - ethanesulphonyl - oxyethylamino - 1,6 - didesoxy-D-mannitol dioxalate are obtained. M.P.: 148–149° C. (decomposition); $(\alpha)_D^{20}=10.6°$ (c.=1 in water). Elementary analysis results are in practical agreement with the values calculated for the formula.

The oxalate salt is dissolved in water so that a saturated solution is obtained. A saturated solution of calcium chloride in water is added in excess. On cooling the calcium oxalate is filtered off and the filtrate is evaporated under mild conditions whereupon ethanol is added to the remainder. The needle crystals are filtered by suction and washed with water until free of calcium ions. The dichlorohydrate of 1,6-bis-β-ethanesulphonyl-oxyethylamino-1,6-didesoxy-D-mannitol is obtained. M.P.: 141–143° C. (decomposition); $(\alpha)_D^{20}=10.88°$ (c.=1 in water). Elementary analysis corresponds to the values calculated for the formula.

Example 3

6.4 g. 1,6-bis-ethyleneimino-1,6-didesoxy-3,4-monoacetono-D-mannitol (see "Die Naturwissenschaften" 42 (1955), 582) are dissolved in 8 ml. of ethanol. The solution is added to a mixture of 20 g. of methanesulphonic acid and 20 ml. of water, at 0° C. while cooling and stirring. The reaction mixture is kept at 5–10° C. overnight. On addition of anhydrous ethanol an oily precipitate appears which is isolated by decantation and covered several times with ethanol. On scrubbing and kneading in ethanol the oil crystallizes. Dissolved in water the solution is filtered whereupon the dimethanesulphonate of 1,6-bis-β-methanesulphonyloxy-ethylamino-1,6-didesoxy-D-mannitol precipitates in the form of needle crystals on addition of ethanol. Elementary analysis corresponds to the values calculated for the formula.

*Example 4*

8.16 g. of 1,6-bis-β-oxyethylamino-n-hexane (see J. Chem. Soc. London, 1957, 805) are dissolved hot in 170 ml. of anhydrous pyridine. On cooling 18.2 g. of methanesulphonylchloride are added while stirring and cooling to 5° C. The reaction mixture is stirred for 3 hours at 5° C. and further 3 hours at room temperature. On cooling the reaction mixture is filtered, the crystals collected on the filter plate are washed with some pyridine, isopropanole and finally with ether. The weight of the product thus obtained amounts to 15.8 g. M.P.: 120–126° C. The product is dissolved in 40 ml. of water. The undissolved residue is filtered off, the filtrate is decolourized by means of charcoal and filtered again. On slow addition of ethanol to the filtrate the dichlorohydrate of 1,6-bis-β-methanesulphonyl-oxyethylamino-n-hexane precipitates in form of mother-of-pearl-like crystal platelets. The weight of the product amounts to 8.8 g. M.P.: 133–134° C. It may be recrystallized from ethanol or from a mixture containing ethanol and acetonitrile. Elementary analysis yields results which practically agree with values calculated for the formula.

*Example 5*

8.1 g. of 1,3-bis-β-oxyethylamino-propane are dissolved in 100 ml. of pyridine and 17.2 g. of methanesulphonylchloride are added while stirring and cooling to a temperature of —5–0° C. The reaction mixture is stirred for an hour at 0° C. and further for 4 hours at room temperature. The crystals appearing in the reaction mixture are filtered by suction and washed with ethanol. The weight of the product thus obtained amounts to 9.9 g. The crude product is dissolved in water, the insoluble part is filtered off, decolourized with charcoal and ethanol is added slowly to the filtrate. 5 g. of 1,3-bis-β-methanesulphonyl - oxyethylaminopropane - dichlorohydrate are obtained in form of needle crystals. The product may be recrystallized from aqueous ethanol. M.P.: 148–149° C. (decomposition).

*Example 6*

48.7 g. of silver methanesulphonate are dissolved in 360 ml. of anhydrous acetonitrile and 18.4 g. of pulverized 1,4 - bis - β - bromoethylamino - n - butane - dibromohydrate are added while stirring. (M.P.: 263° C. with decomposition.) The reaction mixture is boiled for 12 hours while stirring intensely whereupon it is cooled and the precipitate containing a mixture of the product and silver bromide is filtered off and washed with acetonitrile. The filter cake is washed several times with hot anhydrous methanol whereupon the methanol washings are united with the methanol filtrate and hydrogene sulfide is conducted into in order to eliminate the silver content. On filtration of the silver sulfide the solution is evaporated. On adding ethanol to the hot concentrated methanol solution the product precipitates crystalline in the form of needles the weight of which amounts after filtration and drying to 15.8 g. M.P.: 133–135° C. On concentrating the mother liquor, a further amount of 2.7 g. of the product is obtained. M.P.: 132–134° C. The 1,4-bis-β-methanesulphonyl-oxyethylamino-n-butane-dimethylsulphonate may be recrystallized from a mixture of methanol and ethanol or from aqueous ethanol. M.P.: 134–135° C.

*Example 7*

27.8 g. of silver methanesulphonate are dissolved in 190 ml. of anhydrous acetonitrile whereupon 11.3 g. of pulverized 1,4 - bis - β - bromo - ethylamino - 1,4 - didesoxy-meso-erythritol-dibromohydrate are added while stirring. The reaction mixture is boiled for 13 hours while stirring and is filtered after cooling. The precipitate consists of a mixture containing the product along with silver bromide, and is washed on the filter with acetonitrile. The filter cake is washed several times with hot methanol and the methanol solutions and washings are united. The solution is made free of silver by introducing hydrogene sulfide, whereupon the filtered solution is evaporated to dryness in vacuo. The crystalline remainder is recrystallized from a mixture of methanol and ethanol or from aqueous ethanol. The dimethane sulphonate of 1,4-bis-β-methanesulphonyl-oxyethylamino-1,4-didesoxy-meso-erythritol is obtained in the form of white crystals, the weight of which amounts to 7.6 g. M.P.: 143–144° C.

The acetonitrile mother liquor is worked up further as described in Example 1, whereupon further 2.3 g. of

*Example 8* the product are obtained.

12.2 g. of silver methane sulphonate are dissolved in 90 ml. of anhydrous acetonitrile, whereupon 4.4 g. of 1,5 - bis - β-bromo-ethylamino-n-pentane-dibromohydrate (M.P.: 250° C. with decomposition) are added. The reaction mixture is boiled for 10 hours while stirring. The reaction terminated the silver bromide formed during reaction is washed abundantly with acetonitrile. The filtrate is then saturated with hydrogene sulfide and the silver sulfide precipitate is filtered off. The solution is evaporated to dryness in vacuo and the remainder is dissolved in a small amount of water. A saturated aqueous solution of 6 g. oxalic acid is added whereupon 4.6 g. of 1,5-bis - β - methane-sulphonyl-oxyethylamino-n-pentane-dioxalate are obtained. M.P.: 182° C. On recrystallization from water, the product melts at 183° C. (decomposition). Analysis: S percent = 12.3; N percent = 5.42 (calc.: S percent = 12.17; N percent = 5.34).

*Example 9*

14 g. of silver methane sulphonate are dissolved in 100 ml. of anhydrous acetonitrile while stirring, whereupon 6 g. of pulverised 1,6-bis - β - bromoethylamino-1,6-didesoxy-D-sorbitol-dibromohydrate are added. The reaction mixture is boiled for 10 hours while stirring. The reaction terminated the salts precipitated are filtered and washed with acetonitrile. The salts remaining on the filter plate are washed in portions with 50 ml. of hot methanol, whereupon the methanol solution and washings are united and saturated with hydrogene sulfide. On filtration of the silver sulfide precipitate, the filtrate is evaporated to dryness in vacuo, whereupon the partly crystalline gum remaining as residue is recrystallized from ethanol. The product consists of the dimethane sulphonate of 1,6-bis-β-methanesulphonyl-oxyethylamino-1,6-didesoxy-D-sorbitol.

What we claim is:

1. A compound selected from the group consisting of a 3–6 membered alkane substituted on its two end carbon atoms with the group

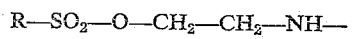

wherein R is an alkyl of 1–3 carbon atoms; a 4–6 membered hydroxyalkane substituted on its two end carbon atoms with the group

wherein R has the same definition as above; acid addition salts of said substituted alkane; and acid addition salts of said substituted hydroxy alkane.

2. A compound according to claim 1 in which R is methyl.

3. Compounds according to claim 1 in which a hexitol is substituted with said group.

4. 1,6 - bis - β - metsanesulphonyl-oxyethylamino-1,6-didesoxy-D-mannitol.
5. 1,6-bis-β-ethanesulfonyl-oxyethylamino-1,6-didesoxy-D-mannitol.
6. 1,4 - bis - β - methanesulphonyl-oxyethylamino-1,4-didesoxy-meso-erythritol.
7. 1,6 - bis - β - methanesulphonyl-oxyethylamino-1,6-didesoxy-D-sorbitol.
8. 1,5 - bis - β - methanesulphonyl - oxyethylamino - n-pentane.
9. 1,4-bis-β-methanesulphonyl-oxyethylamino-n-butane.
10. 1,3 - bis - β - methanesulphonyl - oxyethylamino-propane.
11. 1,6 - bis - β - methanesulphonyl - oxyethylamino-n-hexane.

References Cited by the Examiner

UNITED STATES PATENTS 2,734,068  2/56  Geissman _____ 260—456
2,825,736  3/58  Cope et al. _____ 260—456

OTHER REFERENCES

Bergel: British Medical Journal, August 1961, pages 399–403.

Davis Manufacturing Chemist, June 1960 issue, pages 233–7.

Haddow et al.: Lancet, volume 264, pages 207–208 (1953).

Haddow et al. (II), Nature, volume 182, pages 1164–1165 (1958).

CHARLES B. PARKER, *Primary Examiner.*